(12) United States Patent
Schneider

(10) Patent No.: US 8,458,155 B2
(45) Date of Patent: Jun. 4, 2013

(54) RECORDS MANAGEMENT SYSTEM AND METHOD WITH EXCERPTS

(75) Inventor: Stephen Schneider, Covina, CA (US)

(73) Assignee: Med-Legal Technologies, LLC, Covina, CA (US)

( * ) Notice: Subject to any disclaimer, the term of this patent is extended or adjusted under 35 U.S.C. 154(b) by 0 days.

(21) Appl. No.: 13/436,637

(22) Filed: Mar. 30, 2012

(65) Prior Publication Data

US 2012/0236370 A1      Sep. 20, 2012

Related U.S. Application Data

(63) Continuation of application No. 12/853,927, filed on Aug. 10, 2010, now Pat. No. 8,301,611, which is a continuation of application No. 12/008,139, filed on Jan. 9, 2008, now Pat. No. 7,882,091.

(51) Int. Cl.
*G06F 17/00*       (2006.01)

(52) U.S. Cl.
USPC .......................................................... 707/705

(58) Field of Classification Search
None
See application file for complete search history.

(56) References Cited

U.S. PATENT DOCUMENTS

| | | | |
|---|---|---|---|
| 4,553,261 A | 11/1985 | Froessl | |
| 4,970,554 A | 11/1990 | Rourke | |
| 5,109,439 A | 4/1992 | Froessl | |
| 5,339,412 A | 8/1994 | Fueki | |
| 5,396,588 A | 3/1995 | Froessl | |
| 5,444,840 A | 8/1995 | Froessl | |
| 5,579,419 A | 11/1996 | Yaguchi et al. | |
| 5,666,490 A | 9/1997 | Gillings et al. | |
| 5,926,824 A | 7/1999 | Hashimoto | |
| 5,991,782 A | 11/1999 | Miyagawa et al. | |
| 6,192,165 B1 | 2/2001 | Irons | |
| 6,263,121 B1 * | 7/2001 | Melen et al. | 382/305 |

(Continued)

FOREIGN PATENT DOCUMENTS

| | | |
|---|---|---|
| EP | 0347 254 | 12/1989 |
| EP | 0 749 077 A2 | 12/1996 |

(Continued)

OTHER PUBLICATIONS

Business Editors, H.W., ImageSoft technologies announces new HyperText module for storage and retrieval functionality. Business Wire, pp. 1-1, Mar. 27, 1998.

(Continued)

*Primary Examiner* — Belix M Ortiz Ditren
(74) *Attorney, Agent, or Firm* — Akerman Senterfitt; Peter A. Chiabotti

(57) ABSTRACT

A records management system and method that permits paper records to be tagged, stored and retrieved according to user criteria. The system includes a scanning module, a central server, one or more user workstations and an optical character recognition server. After scanning, the records may then be serialized and categorized by project, and then supplemented automatically by the system with a hypertext data file. The system provides for the manual input of additional hypertext data and merger of the hypertext data file with other records in the project. The end user may then search and/or filter records according to information contained in the hypertext data file. Output from the system may include summary excerpts whereby summaries for data contained in select pages of each document in a project are associated with at least dates, page numbers, and providers for the data.

20 Claims, 8 Drawing Sheets

U.S. PATENT DOCUMENTS

| | | |
|---|---|---|
| 6,427,032 B1 | 7/2002 | Irons et al. |
| 6,602,298 B1 | 8/2003 | Kirshenbaum |
| 6,661,933 B1 | 12/2003 | Hisatomi et al. |
| 6,735,335 B1 | 5/2004 | Liu et al. |
| 6,744,936 B2 | 6/2004 | Irons et al. |
| 6,867,765 B2 | 3/2005 | LeKuch et al. |
| 6,904,171 B2 | 6/2005 | Van Zee |
| 6,996,276 B2 | 2/2006 | Liu et al. |
| 7,190,480 B2 | 3/2007 | Sturgeon et al. |
| 7,447,713 B1 | 11/2008 | Berkheimer |
| 7,599,513 B2 | 10/2009 | Gubo |
| 2002/0002563 A1 | 1/2002 | Bendik |
| 2003/0026481 A1 | 2/2003 | Keskar et al. |
| 2003/0033319 A1 | 2/2003 | Van Der et al. |
| 2003/0229611 A1 | 12/2003 | Hintenach |
| 2005/0008387 A1 | 1/2005 | Sato |
| 2006/0171002 A1 | 8/2006 | Mori |
| 2006/0195687 A1 | 8/2006 | Klein et al. |
| 2006/0206498 A1 | 9/2006 | Fujiwara |
| 2006/0285746 A1 | 12/2006 | Yacoub et al. |
| 2007/0143141 A1 | 6/2007 | Villasenor et al. |
| 2007/0214177 A1 | 9/2007 | Fujiwara |
| 2007/0260575 A1 | 11/2007 | Robinson et al. |
| 2007/0285721 A1 | 12/2007 | Sato |

FOREIGN PATENT DOCUMENTS

| | | |
|---|---|---|
| EP | 0 989 500 A2 | 3/2000 |
| EP | 1 096 775 A2 | 5/2001 |
| EP | 1283485 | 2/2003 |
| EP | 1496 447 | 1/2005 |
| JP | 2003152972 | 5/2003 |
| WO | 0135273 | 5/2001 |
| WO | 03036515 | 5/2003 |

OTHER PUBLICATIONS

Pankaj et al., A Hypertext System to Manage Software Life-Cycle Documents, IEEE Software, pp. 90-98, May 1990.

* cited by examiner

RECORDS MANAGEMENT SYSTEM AND METHOD WITH EXCERPTS

CROSS REFERENCE TO RELATED APPLICATIONS

This application is a continuation of U.S. patent application Ser. No. 12/853,927, filed Aug. 10, 2010, now U.S. Pat. No. 8,301,611, which is a continuation of U.S. patent application Ser. No. 12/008,139 filed Jan. 9, 2008, now U.S. Pat. No. 7,882,091, the entirety of both of which are herein incorporated by reference.

BACKGROUND OF THE INVENTION

1. Field of Invention

The present disclosure relates to records management and, more particularly, to a records management system and method that permit a user to tag, store and/or retrieve pertinent records based on user criteria.

2. Description of Related Art

Records have long been an important part of everyday life. For example, physicians are required—under various laws—to maintain medical records for a certain period of time. These records can be quite useful in diagnosis and analysis of a patient's condition, particularly when the patient has been seen by multiple doctors.

These medical records can also be useful to legal professionals when, for example, a patient files a worker's compensation claim or when a patient files a claim for medical malpractice.

In the past, medical records were largely maintained as paper records in file rooms. However, as the volume of paper records increased, so did the space required to store them. As a result, those persons responsible for maintenance of these medical records moved to electronic scanning and storage of their medical records.

Although advances have been made in that medical records are electronically stored, the process of reviewing the records is not necessarily as streamlined or cost effective as it could be. For example, an attorney responsible for reviewing and analyzing a worker's compensation or medical malpractice claim may charge by the hour. The longer it takes to review the medical records, the greater the amount of money expended for the records review.

Along the same lines, doctors and other professionals may need ready access to pertinent medical records in order to make vital medical decisions regarding a course of treatment for a patient. In this instance, a shortened time for medical records review may be crucial. In addition, doctors may be responsible for numerous patients at a single point in time. Time taken for one patient may mean time unavailable for another. This factor also highlights the need for a more streamlined medical records review.

Accordingly, there is a need for a records management system and method that permit rapid retrieval and filtering of pertinent electronic records.

When attorneys and doctors are presented with a voluminous records project, they may need not only a streamlined and cost effective way to review the records, but they may also need a streamlined and cost effective way of creating a new custom-built record that includes only the pertinent information that was reviewed.

Accordingly, there is a need for a record storage and retrieval system that permits the creation of a new record that includes on the pertinent information reviewed.

At times, when legal professionals are involved in the review of medical records for purposes of worker's compensation claims, medical malpractice claims and the like, they may need to readily cite to particular pages of those records in litigation. Accordingly, there is a need for a record storage and retrieval system and method that readily permit citation to those records if needed.

BRIEF SUMMARY OF DISCLOSURE

The present disclosure addresses the foregoing deficiencies of the prior art by providing a records management system and method that permit tagging, storage and retrieval of electronic records based on user criteria. In accordance with one embodiment of the present disclosure, a records management system is provided. The system comprises a location designation module configured to designate an electronic storage location for said each representation of a page; and a data module configured to create an electronic data file that corresponds to said each representation of a page, wherein the electronic data file relates said each representation of a page to a document within the project. The electronic data file includes the electronic storage location for said each representation of a page.

The system further comprises at least one workstation configured to receive input of additional data for the electronic data file, the input additional data further including a category for said each representation of a page, a date for said each representation of a page, and a provider for each said representation of a page; and a supplementation module configured to supplement the electronic data file with said input additional data for the electronic data file.

The system still further includes a merging module configured to merge said each representation of a page with the corresponding electronic data file for each said representation of a page such that said each representation of a page and the corresponding electronic data file are accessible from a single electronic project file.

Finally, the system includes output that is a summary excerpt for at least one representation of a page. The excerpt includes at least one date, at least one page number and at least one provider associated with the at least one representation of a page.

In accordance with another embodiment of the present disclosure, a records management method is provided. The method comprises the steps of designating an electronic storage location for one or more electronic files that represent each page of each document in a project; and creating an electronic data file that corresponds to said each representation of a page, wherein the electronic data file relates said each representation of a page to a document within the project, wherein said electronic data file includes the electronic storage location for said each representation of a page.

The method further comprises receiving input of additional data for the electronic data file, and a category for said each representation of a page, wherein the input additional data includes a date for each said representation of a page, and at least one provider for each said representation of a page; and supplementing the electronic data file with the input additional data.

The method still further comprises merging said each representation of a page with the corresponding electronic data file for said each representation of a page such that said each representation of a page and the corresponding electronic data file are accessible from a single electronic project file.

Finally, the method comprises outputting at least one summary excerpt for at least one representation of a page, the summary excerpt including at least one date, at least one page number and at least one provider for the at least one representation of a page.

These, as well as other objects, features and benefits will now become clear from a review of the following detailed description of illustrative embodiments and the accompanying drawings.

DETAILED DESCRIPTION OF THE DISCLOSURE

The records management system of the present disclosure may be used to tag and store paper or electronic records so that a user can sort, filter, and edit documents that better show the information in which the user is interested.

Figure 1:
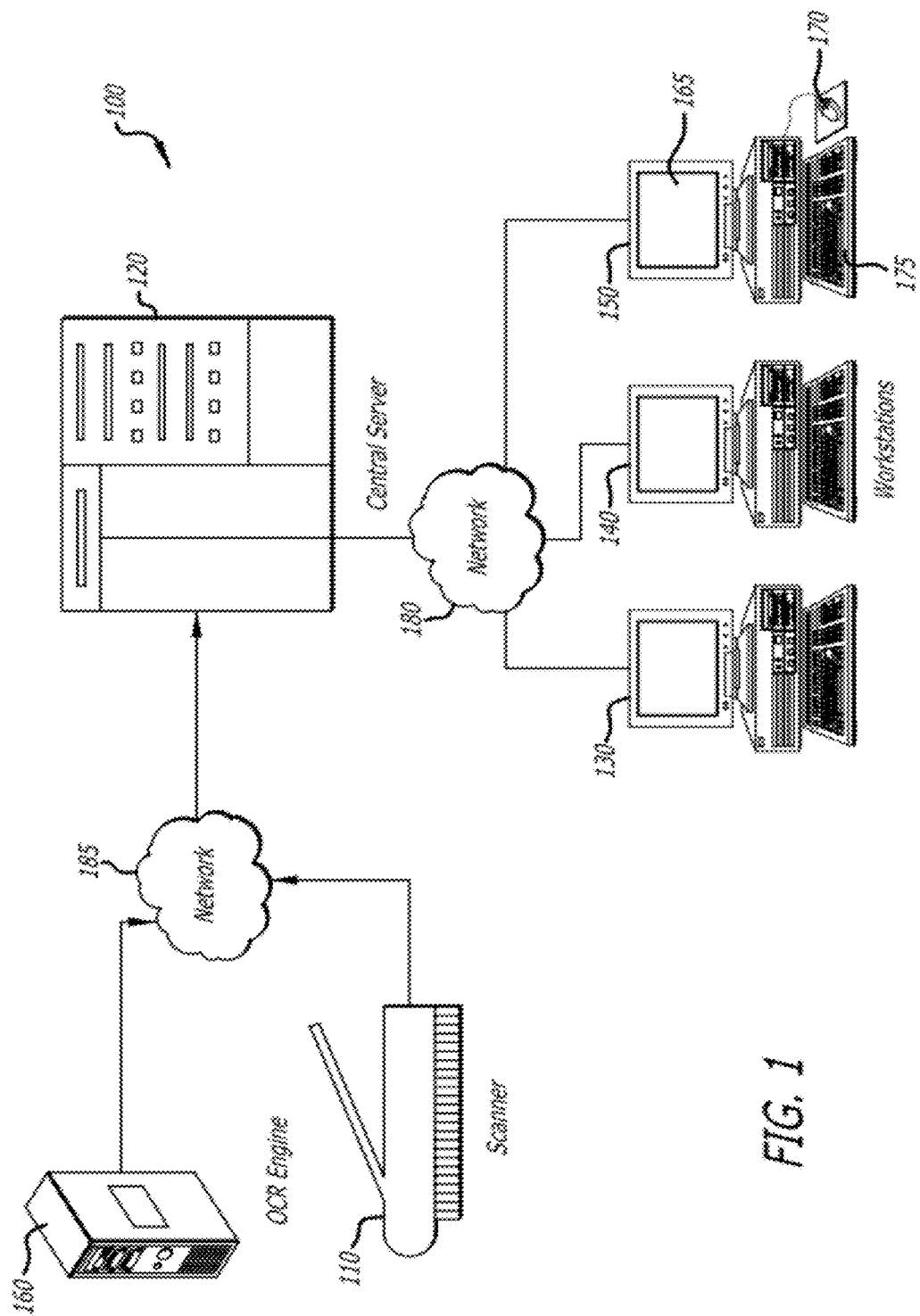
FIG. 1 is a records management system in accordance with one embodiment of the present disclosure.

Referring now to FIG. 1, illustrated is a records management system 100 in accordance with one embodiment of the present disclosure. Included within the records management system 100 is a scanning module 110 that is operatively coupled to a central server 120. Also illustrated are workstations 130, 140, 150 and an optical character recognition engine 160, each of which is also operatively coupled to central server 120.

It should be understood that connections between the various components of the system 100 may be configured in any number of ways to advance the goals of the present disclosure without departing from the inventive concept. For example, the connections between various components of system 100 may be made via wide area networks (such as the Internet) as well as local area networks (LAN's). Moreover, the connections may be, without limitation, wireless or wired.

Each one of workstations 130, 140, 150 may be a conventional personal computer. Workstations 130, 140, 150 may be provided, for example, as IBM® compatible computers, APPLE® MACINTOSH® personal computers, UNIX®-based workstations, or any other equivalent computer systems, whether laptop, desktop or otherwise. Under some circumstances, the workstations 130, 140, 150 that may be used to input and receive information from the central server 120 may be personal digital assistants (PDA's) or any other such device. The computer system used may also be e.g., a WINDOWS® hand-held device. Some mobile phones may be used to input and receive information, where such capability is available.

Each of workstations 130, 140, 150 may include a central processing unit (not shown), a display 165, a mouse 170, and a keyboard 175 for receiving user input into the system. While three workstations 130, 140, 150 are shown in the present illustration, it should be understood that there could be only one workstation, or a large number of workstations depending on the capacity needed for a particular implementation of the system of the present disclosure. Both the mouse 170 and the keyboard 175 may be coupled to the user's workstation so that the user's computer may receive information that is input by him/her, and so that information can be routed through the network 180 to the central server.

The networks 180, 185 in the current illustration are the Internet; however, the networks 180, 185 may be any other type of wide area network, local area network, or other means by which workstations may communicate with the central server.

The exemplary workstations are for descriptive purposes only. Although the description may refer to terms commonly used in describing particular computer systems, the description and concepts equally apply to other processing systems, including systems having architectures dissimilar to those shown in FIG. 1.

The read only memory (ROM) for each of workstations 130, 140, 150 may operate to effect permanent storage of information. Random access memory (RAM) for each of workstations 130, 140, 150 may operate to effect temporary storage of information. Each of the aforementioned components may be coupled to a bus. Operation of workstations 130, 140, 150 may be generally controlled and coordinated by operating system software. With the records system 100 of the present disclosure, the operating system that runs on workstations 130, 140, 150 may be, but is not limited to, MICROSOFT® WINDOWS VISTA®, MICROSOFT® WINDOWS XP®, or a version of MAC OS® or UNIX® operating system or the like.

Alternatively, the principles of the present invention can be applied to a computer system using a version of DOS (disk operating system), or other operating system programs. An operating system resident in system memory and executed by the CPUs of workstations 130, 140, 150 may coordinate the operation of the other elements of workstations 130, 140, 150.

Data and software, including the filtering software to be described in more detail hereinbelow, may be provided to and extracted from workstations 130, 140, 150 via removable storage media such as, without limitation, a CD-ROM or DVD.

Data may also be provided to workstations 130, 140, 150 via scanner 110 and software for reading information via the scanner 110. Scanner 110 may be, without limitation, an optical character recognition (OCR) scanner.

Workstations 130, 140, 150 may include a communications adapter which allows the workstation to be interconnected to a local area network (LAN), a wide area network (WAN) or a public network. Thus, records data and related computer program software can be transferred to and from workstations 130, 140, 150 via the adapter and network 180.

Portions of the filtering software used to achieve the purposes of the present disclosure can be resident on workstations 130, 140, 150. Alternatively, all of the filtering software may be resident on central server 120 such that web-based storage and filtering may occur.

Figure 2:
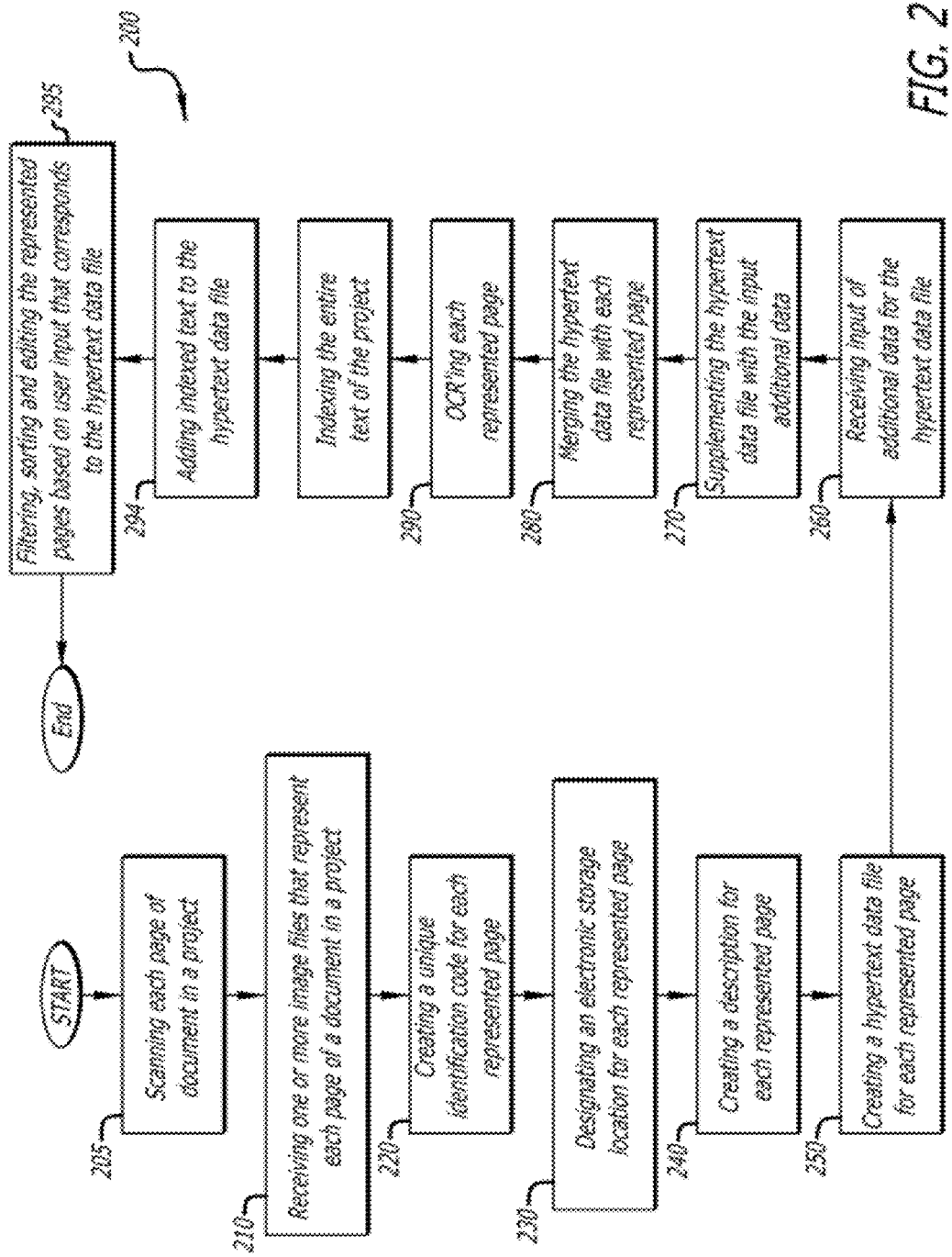
FIG. 2 is a flow chart illustration of a method for records management in accordance with another embodiment of the present disclosure.

Referring now to FIG. 2, shown is a flow chart illustration of a method 200 for records management in accordance with one embodiment of the present disclosure. As illustrated, the method 200 may begin with scanning paper documents for each page of a document in a project at step 205 using a scanner; the scanner may operate with and/or be controlled by associated software that provides for image cleanup and optimization.

A project as described herein may be composed of a series of related documents. The documents may be deemed related by an end user, or the company/entity providing the scanning services, or a company/entity providing records maintenance services, and/or any other person/entity. For example, the end user of the system of the present disclosure may submit a series of documents for use with the system of the present disclosure. Also by way of example, the company that provides the scanning services may group all the documents for a particular end user into a group, thus identifying the documents as a project.

The documents in a project may consist of or include, for example, medical and other records related to a worker's compensation injury, a medical malpractice claim or any other grouping of records relevant to a particular goal. Documents in a project may also consist of, or include, for example, medical records for a particular person or all persons in an organization. While the present disclosure describes the project as including medical records, it should be understood that the records could be any number of types of records including but not limited to court files, merger/acquisition documents, employment records or any other type of record whether business or personal.

At step 210, software used in conjunction with the present disclosure may receive and/or create one or more image files for each scanned page of each document in the project. The image file may be created in a tagged image file format (TIFF), a joint photographics expert group (JPEG) format, a portable network graphics (PNG) format, a graphical interchange format (GIF) or other format that is suitable for representing each page of a document in a project. Each page may be represented in one or more of these formats or any other suitable image format.

It should be understood that the system and method of the present disclosure are also suitable for use with records that are not scanned, but are in another format such as a word processing application like MICROSOFT® WORD®, a chart format such as those found in MICROSOFT® EXCEL® or other type of program that can be used to create a record. In this case, the scanning of paper records and the creation of image files would not be necessary. Moreover, the later-described optical character recognition may not be necessary for translating text from the image files into machine-readable text since the text in electronic file may already be machine-readable.

At step 220, each page of the scanned paper records in the project may be ordered serially and given a serial number, Bates label or other unique identification code for each page. Software resident on the central server and/or workstations may be configured to provide this functionality. The software may begin the serialization process as soon as the pages are scanned or at any other suitable time.

At step 230, software resident on the central server and/or workstations may also designate an electronic storage location for each scanned page of each document in a project. This will allow the end user to easily ascertain the storage location of a particular record. The location may be, e.g., a project folder.

At step 240, software resident on the central server and/or workstations may create a description of each scanned page of each document in a project.

At step 250, software resident on the central server and/or workstations may build an electronic data file for each scanned page of each document in the project. This electronic data file may be or include a hypertext data file. It is important to note that the data record in the hypertext data file (metadata) may be used to relate the page to the particular document within the project.

The hypertext data file may include the unique identification codes, image files, locations and page descriptions as well as other information related to the project. The hypertext data file may also include a source indicator for the each scanned page, e.g., the author or the company from which the document originated. The hypertext data file may further include a date associated with the page. The date may be, for example, the date of creation of the page or a date of delivery for the record if the record is from a third party.

The hypertext data file may also include a category for each page. The category may be, for example, copy service paperwork in case the records relate to a legal proceeding. The category may also be more generic such as "general or administrative." In the case of medical records, the categories may include, by way of example and not limitation, doctor's notes, laboratory, nursing, radiology, reports, and the like. In brief, the category may be any category that is useful to the end user. The hypertext data file may be uploaded to the central server so that additional identifying input may be performed by humans as described immediately below. The user may also be permitted to upload his/her own documents and add them to the document group for searching and other functions just as if the newly added documents were in the original set of documents.

The central server now has all of the above-identified information related to the project. At this point, a manual process of identifying metadata and key text on the pages of documents may be performed by trained human readers at workstations that are operatively coupled to the central server as described in connection with FIG. 1.

This metadata and key text may include any pertinent information that would allow the records to be easily retrieved. For example, this metadata and key text may include an author for the pertinent record page; a date of the page, note or report; a category for each record type; and a provider for each record page. This metadata and key text may be added to the hypertext data file. At step 260, this metadata and key text that were input by the humans at their workstations may be transmitted to, and received by, the central server. Thus, tracking of the metadata to the page, document, and project may be preserved. The information input by the trained readers may be included in data fields and/or data types used to sort and filter the records, respectively.

At step 270, software resident on the central server and/or workstations may supplement the hypertext data file with the input of additional data. Once the hypertext data file is completed for the series of documents it may be merged together into one project file at step 280.

The hypertext data file may be encrypted for privacy reasons, including those related to the Health Insurance Portability and Accountability Act (HIPAA). Software resident on the server and/or workstations may be used to perform encryption functions. Such software is commercially available.

The software of the present disclosure may cause represented pages of the project to be passed through an optical character recognition (OCR) engine server at step 290. The OCR engine server may be used to translate handwritten or typed text from the one or more image files into machine-readable text.

Software resident at the central server and/or workstations may also index the entire text of the project at step 293 and add that text to the hypertext data file at step 294 so that it may be used for filtering, sorting and editing by the end user at step 295 upon review of the records. This filtering, sorting and editing of step 295 are described in further detail hereinbelow in connection with FIGS. 3-7.

While the steps of the method have been described hereinabove in a particular order, this order is non-limiting. It should be understood that the order could vary while still accomplishing the goals of this disclosure without departing from the inventive concept.

Once the project is assembled, it may be delivered to the end-user via CD, DVD, online download, FTP, USB key, or any other type of suitable data transfer means.

Now, the end user charged with reviewing the records in a project can open the project in a viewer application provided by filtering software used in accordance with the present disclosure. The end user may operate the software on a computer system similar to those of the workstations described hereinabove in connection with FIG. 1. Using this viewer application, the end user can sort the metadata by any of the fields, such as description, date of the page, record location, author of the records, etc. This sorting capability permits the end user to "shuffle" together pages from various documents in a project so that the end user may view these pages in a sequence that allows the end user to spot trends the end user may be seeking.

Figure 3:
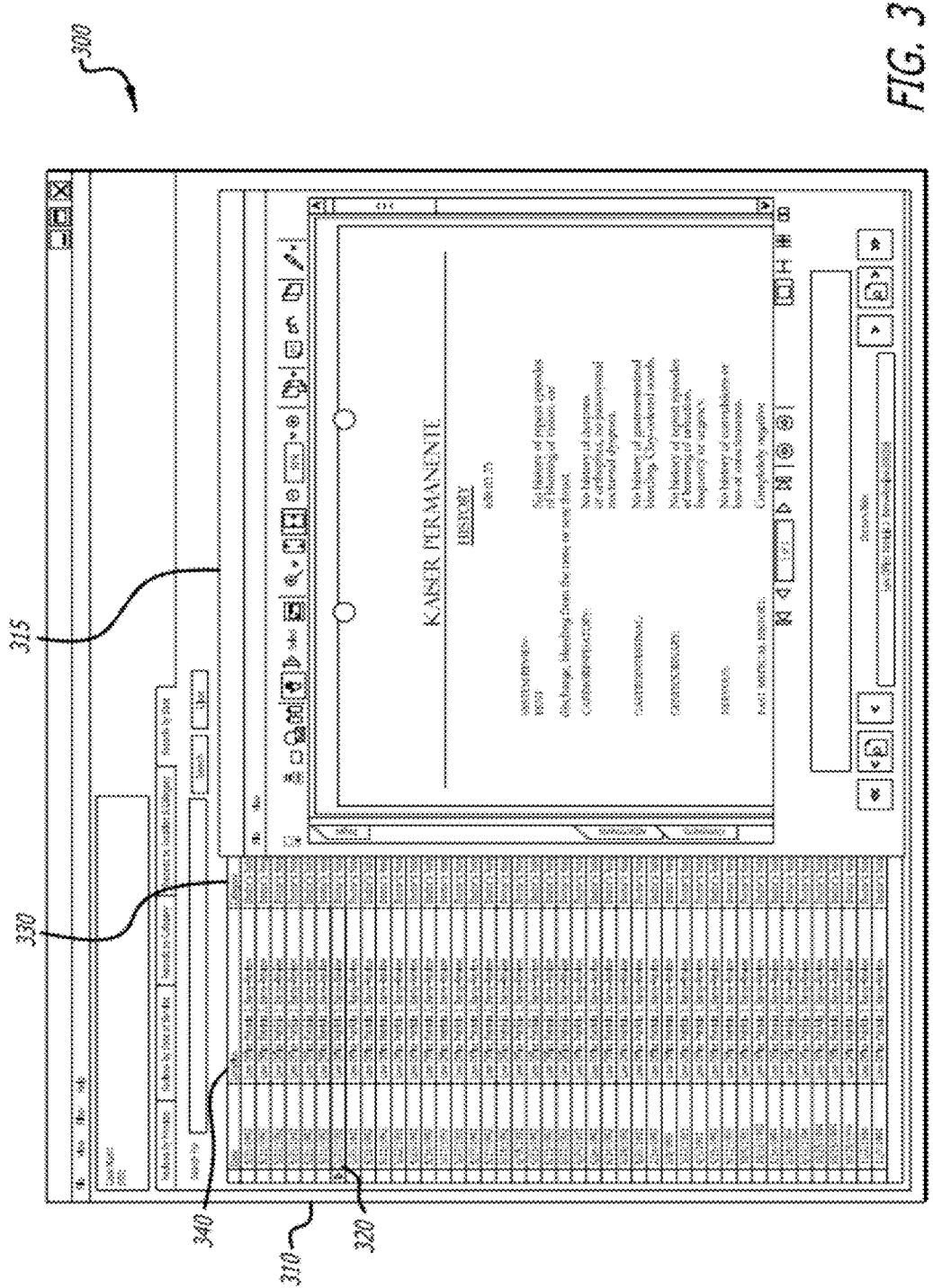
FIG. 3 is a screenshot illustration of records that have been sorted by date and category in accordance with one embodiment of the present disclosure.

Referring now to FIG. 3, illustrated is a screenshot 300 of records that have been sorted by date and category. As shown, records may be mixed from different sources altogether, and "shuffled" by date and category. A records listing may be found in the background screen 310. A viewer window 315 is shown in the foreground.

When an end user double-clicks on a record or page, e.g., at text box 320, the end user may obtain the viewer window that shows the record or page. On that page, the end user can see the category for the record's page as shown at column 330, the location of the record from which the page came as shown at column 340, and the original page number in those records (hidden). As shown at background screen 310, the records have been sorted according to date. Also provided may be a location for the user to type and save notes. Navigation buttons may permit the user continue to page through the current sort, viewing each page in the sequence the user currently has going on the main form. The software of the present disclosure may keep track of where each page being viewed belongs with respect to the original documents submitted.

Using filtering software as described in the present disclosure, pages may be marked as deleted or suppressed by the user according to data type so that undesired pages are filtered out while the user is viewing the project. Examples of data types are the location or author of a set of pages, which can also be easily filtered out of the project using a viewer application provided by the software described in the present disclosure, adding to the efficiency of viewing the project documents. Other data types include provider name and category, which may be filtered such that only records from certain categories or provider are grouped together in a listing. The record pages can be filtered according to date range, and based on whether notes or edits were made to the record page. Additional data types can be identified and filtered in or out as the end user desires. Alternatively, filtering could occur such that pages are marked so that only pages related to data types are displayed.

Text searches can be performed within the viewer application provided by the software described in the present disclosure. A search can be performed of both the scanned text of the record pages, and the metadata that was created. The viewer application may build a new subset of pages where the text appeared, and display the list according to the existing sort order and filter the user had in place at the time the search was performed. This helps narrow down the pages the user must read when looking for the trends or evidence that the end user seeks.

Notes may be typed for any page within the provided viewer application and saved to the metadata file. This data may be included in subsequent searches.

The metadata for the pages that was originally created as part of the service can be edited and saved into the project by the end user.

As described above, the end user of the viewer application can build a custom set of pages that is sorted and filtered just the way they want to see them. They can then create a new PDF document of the results which can then be printed, saved to disk, emailed, etc. The subsequent PDF can be scanned using an OCR scanner, and can include custom watermarks/stamps and page numbering schemes.

The filtering software described herein may be a desktop application and a web application (when the documents are stored on a web or file transfer protocol (ftp) site).

Figure 4:
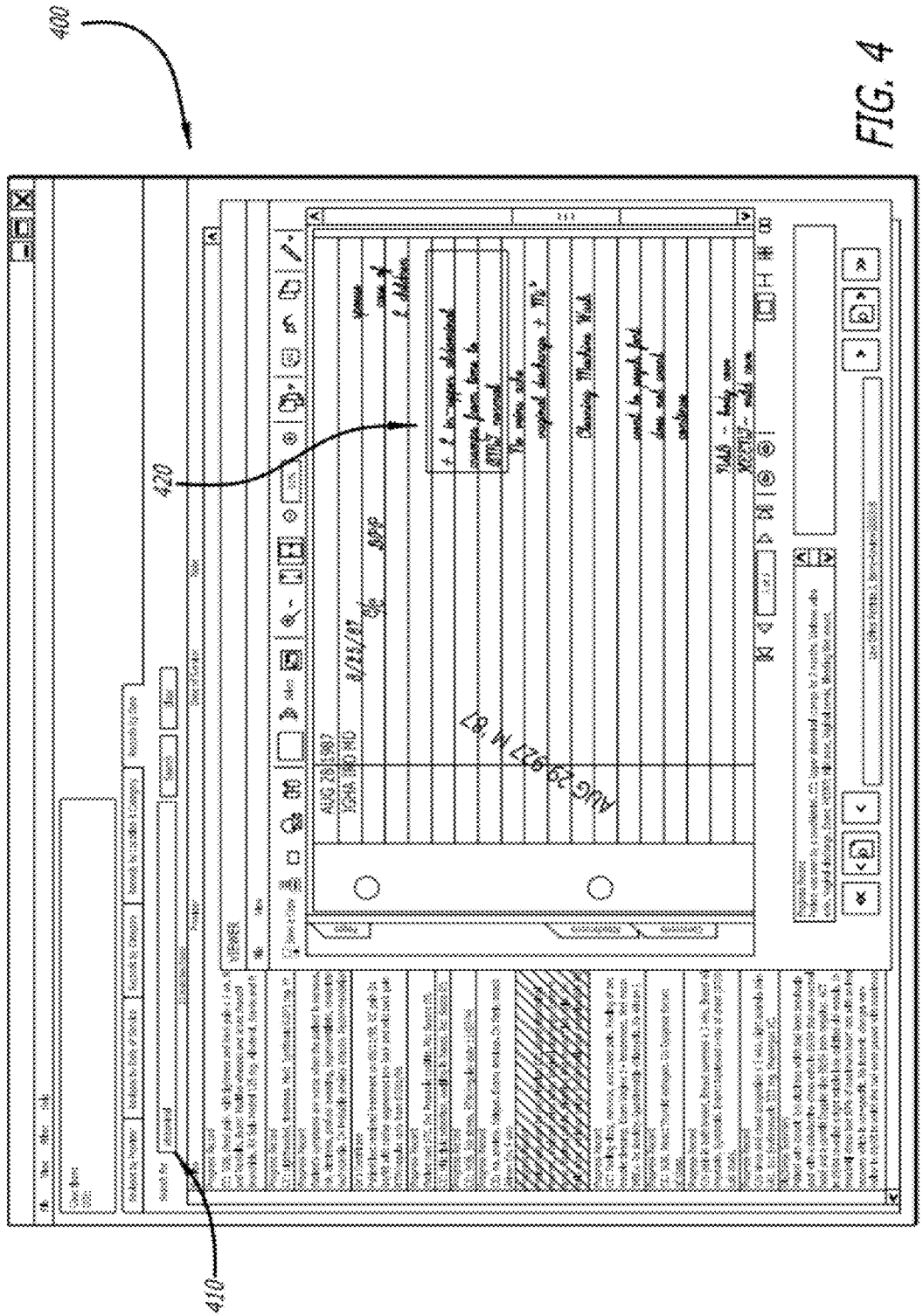
FIG. 4 is a screenshot illustration that results from a user query for documents containing a particular search term in accordance with one embodiment of the present disclosure.

Referring now to FIG. 4, illustrated is a screenshot 400. Here, the user has entered a search query for the record pages that contain the term "abdominal" as indicated at text box 410. The user has double-clicked to get the page in the records where the word "abdominal" appeared. As illustrated by the text shown in text box 420, the word "abdominal" did not appear in the records. However, as shown in text box 420 a hand-written note is shown with the word abdominal abbreviated thereon as "abd." Many of today's search engines might not have found this word. The "Search for" textbox may be used with a search engine style of syntax for query commands. Search commands can be used on the review data, OCR data from the images themselves, and/or a combination of both.

The viewer application may include a full search engine. Wildcards may be used, partial searches, fuzzy searches, etc. may all be included in searches performed. Search commands may be performed using a variety of query syntaxes. The query can range from single term searches to more complex search queries involving wildcards and Boolean operators. For example, where a user wishes to search for the term "knee", the viewer application should display results of all record pages and/or the pages' metadata that contain the word "knee." The user may also search for the phrase "left knee." In this case, the viewer application would display all pages and/or metadata that contain the phrase "left knee."

Various fields of data for the record pages can also be searched. For example, the user could perform a search of all records that contain knee in the title field using a "title:knee" query. Wildcard searches may be performed by inserting a wildcard indicator such as "?" or "*". For example, where a user enters the query "abdom*", the search results would include pages that contain the word "abdomen" and "abdominal."

Users may also perform fuzzy searches which will include results for terms having the same or similar spelling. For example, if the user wishes to search for "abdomen," but spells it incorrectly as "abdomen," the search results should include pages that include the word "abdomen."

The user may restrict searches to particular ranges using a range query. For example, the user may search for pages that have particular dates associated therewith. If a user only wishes to see those results that are associated with the year 2006, the user could input the search query "date: 20060101 TO 20061231." It should be noted that other range searches may also be available to the user.

Boolean operators may also be used as search queries in accordance with the present disclosure. For example, if a user wishes to pull all pages that contain the terms "knee" and "abdomen" the user may input the search query "knee or abdomen." The results should include all pages that contain the term knee, as well as all pages that contain the word "abdomen." If the user wishes to view all pages that contain the terms "knee" and "abdomen" together, the user may input the search query "knee and abdomen." The results should include all pages that contain the term "knee" and "abdomen" for a single page.

Other types of search queries may be used in accordance with the present disclosure. For example, the user may not wish to view certain pages and filter them out. If a user wishes to view all pages that contain knee, and is curious but not set on getting all the results that contain "left" as well, the user may input the search query "left+knee" to accomplish this result.

Figure 5:
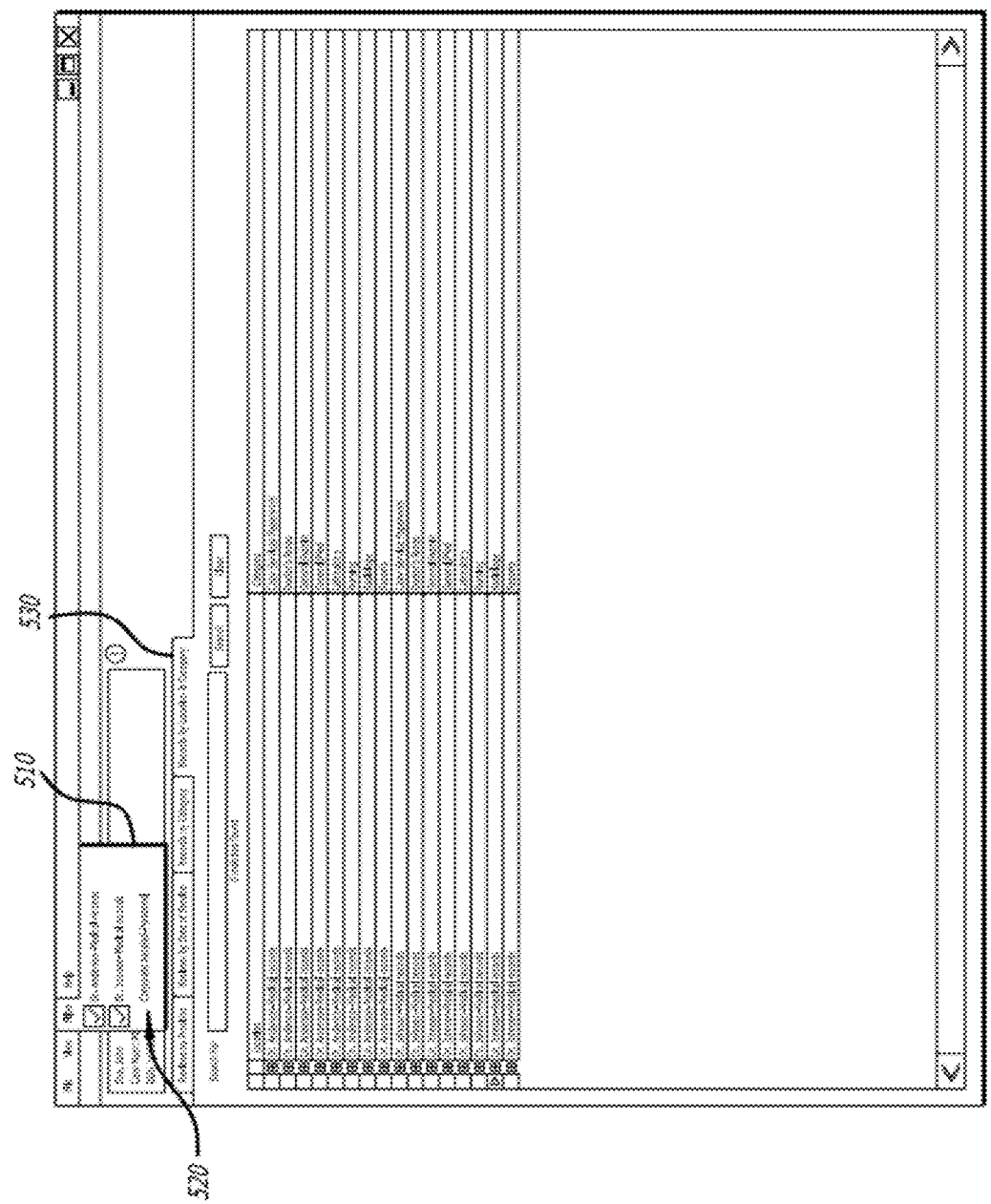
FIG. 5 is a screenshot illustration of records that have been sorted by location and category in accordance with one embodiment of the present disclosure.

Referring now to FIG. 5, illustrated is a screenshot 500 that shows a viewer application provided by filtering software in accordance with one embodiment of the present disclosure. As shown under the "Filter" drop-down menu at text box 510, there are three sources of records. Here, the user has chosen not to view or search the personnel records as indicated by unchecked text box 520. Because the "Records by Location & Category" tab has been selected as indicated by user selection of tab 530, the records are displayed in this manner using these data types.

Figure 6:
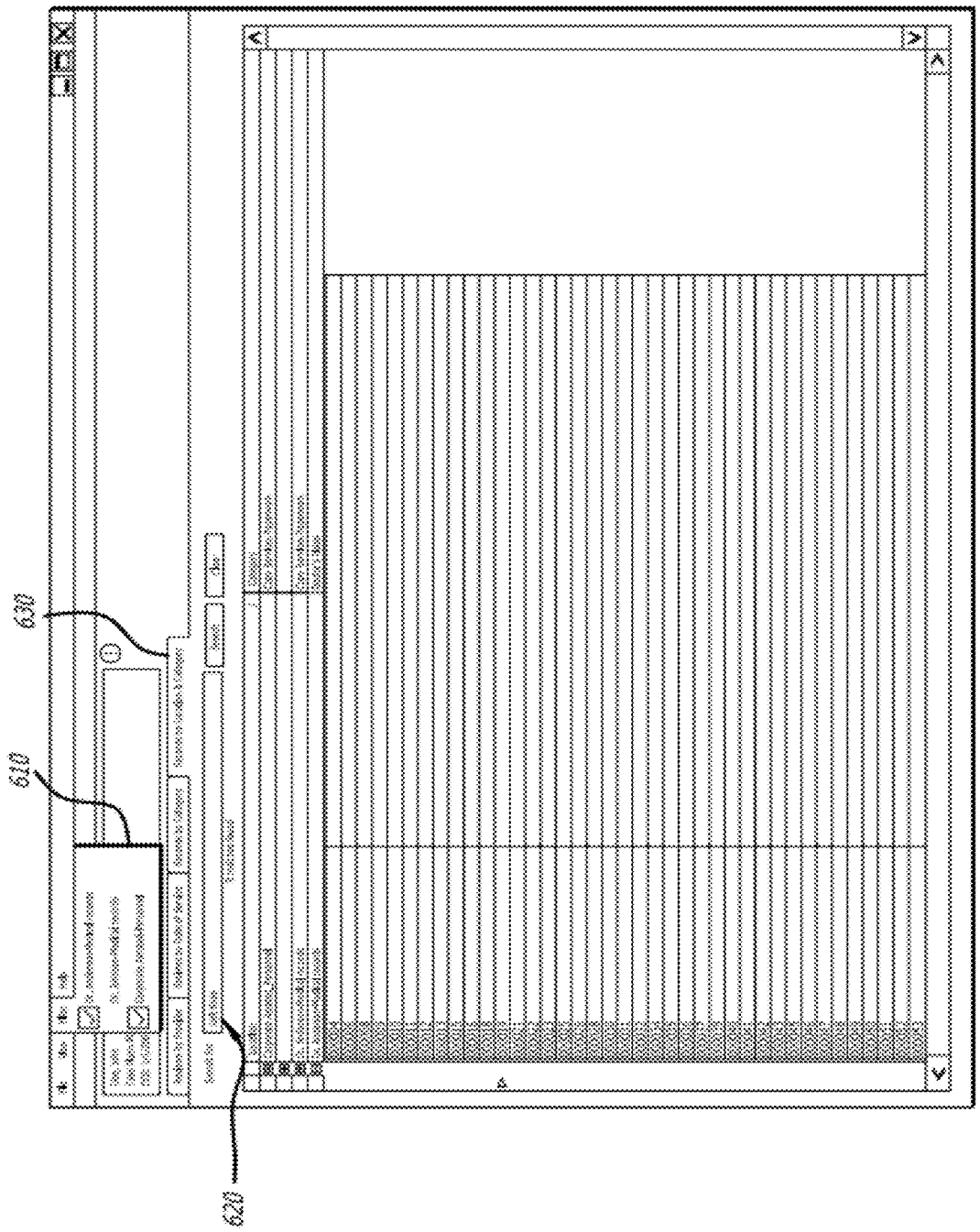
FIG. 6 is a screenshot illustration of a viewer application as a user searches and filters selected records in accordance with one embodiment of the present disclosure.

Referring now to FIG. 6, illustrated is a screenshot 600 that shows the viewer application as the user runs a search of selected records. Here, as shown by text box 610 under the "Filter" drop-down menu, records are available from three sources, including Dr. Anderson's medical records, Dr. Johnson's medical records and a corporation's personnel records. In the screenshot of FIG. 6, the user has filtered out Dr. Johnson's medical records for viewing and searching. The user has also entered, a search query for records related to patient John Doe's "left knee", as indicated by text box 620. This allows the user to search for each page of the Dr. Anderson's records as well as Corporate Aerated's personnel records for the phrase "left knee". Also as shown, the "Records by Location & Category" tab has been selected at tab 630.

In this manner, the user can build a new set of records using the viewer application. The new set of filtered records may be created as an image file, a .pdf file or any other type of format. The new file containing the filtered records may include Dr. Anderson's records and Corporate Aerated's personnel records. This new file may include data that is filtered by location, sort order and even search criteria.

Figure 7:
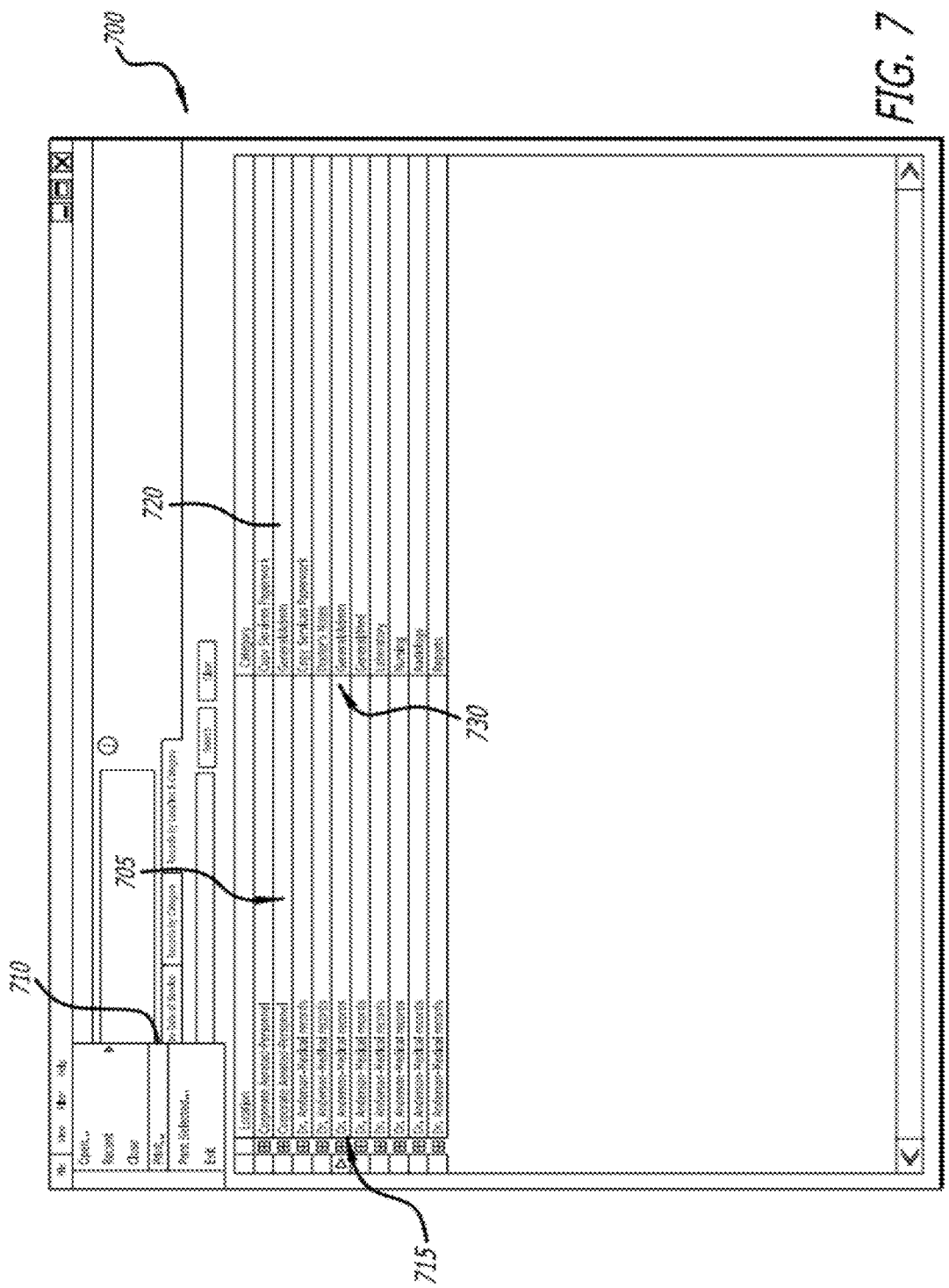
FIG. 7 is a screenshot illustration of filtered records as the user prepares to create and print a new record that contains only the filtered records in accordance with one embodiment of the present disclosure.

Referring now to FIG. 7, illustrated is a partial screenshot of the filtered records of FIG. 6 as the user prepares to print the new file containing the filtered records. More particularly, here, the user is preparing to print the new file containing Corporate Aerated's personnel records which have been highlighted at text box 705 as well as Dr. Anderson's medical records which has an arrow pointing to text box 715. As shown, the user has selected the print option at text box 710. As shown at the right at text boxes 720, 730, the category for these records, as filtered by the user, is "general/admin."

It should be understood that data can be filtered based on any information in the hypertext data file. Filtering can be performed according to the data type of provider name as shown in FIG. 7 such that records from certain providers are removed from the display. Filtering could also occur by the data type of category. For example, the user could view only those records that are categorized as "doctor's notes." Various date ranges can also be filtered as data types. For example, a user could view only those records that incorporate a certain date range. Filtering could also occur such that the user only views pages that do not have note text. The user could then type notes only for certain pages. The user could then filter the records such that only those pages with notes are displayed.

The records management system and method of the present disclosure may be used to tag and organize paper or electronic records so that an end user can sort, filter, and edit documents that better show the information in which the user is interested. The end user can then shuffle through the documents in the order preferred by the end user, thus readily permitting a focused review of the records for purposes such as trend-spotting.

The records management system and method of the present disclosure may be used to create summary excerpts which may be output from the system. The summary excerpt output from the records management system may be electronic or hard copy. In the case of electronic output, after the project has been scanned and each page categorized, a searchable electronic file may be created of the records in the project. The resulting electronic page representations may then be bookmarked. It should be noted that, in the case of hard copy output, the records may be grouped and separated with a paper tab in lieu of a bookmark.

Figure 8:
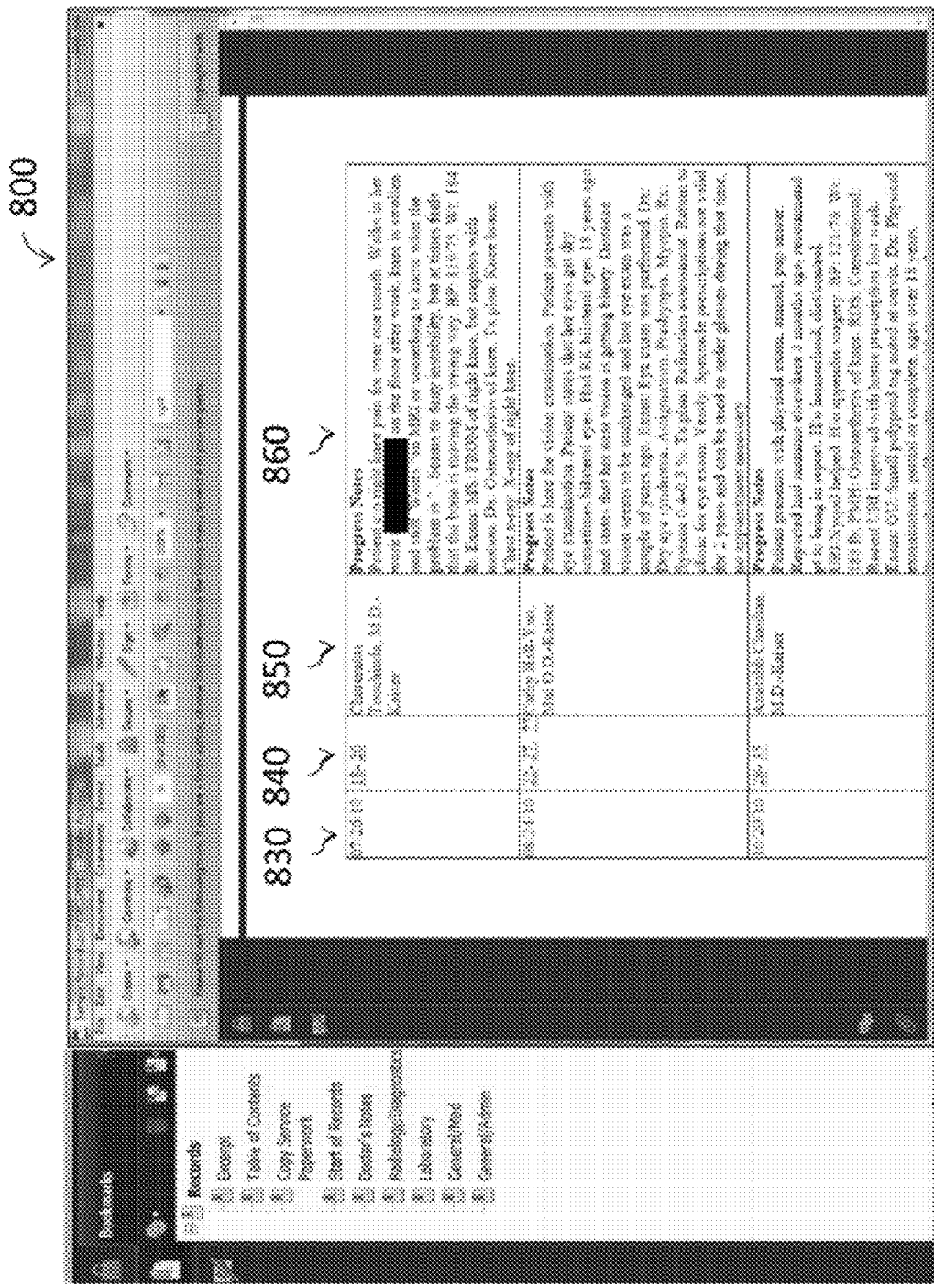
FIG. 8 is an example of electronic output from the records management system and method that includes excerpts in accordance with one embodiment of the present disclosure.

Referring now to FIG. 8, illustrated is an example of electronic output from the records management system that includes summary excerpts. As shown to the left of the screen, the output may include a bookmark section 810 that shows a user how to quickly locate the excerpt, table of contents, copy service paperwork, the start of the records compiled for the user, doctor's notes, radiology/diagnostics, laboratory, general/med (or general/medical) and general/admin (or general administrative) categories for the records. Categories were described in detail hereinabove. The electronic output may be sent to the screen and/or printer. It should also be noted that when the records are output in hard copy, the records may be output from the system to a printer with physical tabs that indicate where the documents associated with the pertinent categories begin.

In the present illustration, the excerpt bookmark in the bookmark section 810 of the screenshot 800 has been selected. Accordingly, an excerpt is shown in display section 820. The excerpt bookmark shown in the bookmark section 810 includes information from the hypertext data file that has been supplemented by skilled readers. Such skilled readers may be trained, for example, to summarize data from the records that may be of interest to doctors and lawyers in a medical malpractice case.

In the present illustration, the summary excerpt has been presented in chronological order to give an informative portrayal of treatment history. The summary excerpt is a synopsis of what is found on the page (or representation of a page). The summary excerpts may be used to input handwritten notes as searchable text. Here, skilled readers have read handwritten notes and transcribed them into the records management system. The transcription may be entered into the system in a number of ways, including by supplementing the hypertext data file. When a bookmark is selected at section 810, display section 820 may display pages grouped under the selected bookmark. Here, the excerpt bookmark has been selected at section 810; therefore, display section 820 displays excerpts associated with the records.

Here, the excerpt includes a date column 830 that shows a date that corresponds to the associated records. The excerpts are displayed in chronological order. Here, as shown at the first row, the first excerpt is dated "7/26/10". At the second row, the later date of "8/24/10" is shown. Meanwhile at the third row, the still later date of "10/20/10" is shown.

As illustrated at column 840, the summary excerpt may further include one or more links to the pertinent page(s) (or representations of page(s)) of the records for which the summary excerpt was written. Here, the first row shows links to pages 18-20 of the pertinent document.

As illustrated at column 850, the summary excerpt may still further include one or more providers for the associated pertinent page(s) (or representations of page(s)) of the records for which the summary excerpt was written. As shown at the first and third rows, a single provider is given. At the second row, multiple providers are given for the associated excerpt.

At column 860, the summaries written by the skilled readers are shown. Here, the summaries have been given the heading of progress notes. These summary excerpts may include handwritten notes that have been typed in by human readers. Using the summary excerpts described herein, the end user may get a clear picture of treatment history that may not have been previously apparent.

While the specification describes particular embodiments of the present invention, those of ordinary skill can devise variations of the present invention without departing from the inventive concept.

I claim:

1. A records management system, comprising:
a location designation module configured to designate an electronic storage location for each representation of a page of a document;
a data module configured to create an electronic data file that corresponds to the each representation of a page, wherein the electronic data file relates the each representation of the page to the document within a project, and wherein the electronic data file includes the electronic storage location for the each representation of a page;
a server configured to receive input of additional data for the electronic data file, the additional data including a category for the each representation of a page and a date for the each representation of a page;
a supplementation module configured to supplement the electronic data file with the additional data for the electronic data file;
a merging module configured to merge the each representation of a page with a corresponding electronic data file for the each said representation of a page such that the each representation of a page and the corresponding electronic data file are accessible from a single electronic project file; and
a summary excerpt of at least one each representation of a page.

2. The system of claim 1, further comprising:
a description module configured to create a description of the each representation of a page.

3. The system of claim 1, further comprising:
a serialization module configured to create a unique identification code for the each representation of a page.

4. The system of claim 1,
wherein the server is configured to receive and store the one or more electronic files that represent each page of each document in a project.

5. The system of claim 1, further comprising:
a scanning module configured to scan each page of each document in a project;
an image file creation module, the image file creation module configured to create image files from scanned pages; and
wherein the server is coupled to the scanning module, the server being further configured to receive the image files.

6. The system of claim 1,
wherein the summary excerpt of at least one each representation of a page includes a summary of a plurality of the each representation of a page from a plurality of documents.

7. The system of claim 1,
wherein the summary excerpt of at least one each representation of a page includes a page number associated with the at least one each representation of a page.

8. The system of claim 1, further comprising:
a viewer application configured to permit electronic sorting and display of the each representation of a page and the corresponding electronic data file, and
wherein the electronic sorting is based on user selection of a data field in the electronic data file.

9. The system of claim 8, wherein the viewer application is further configured to receive input of user edits for at least one of the each representation of a page, and supplement the electronic data file with the user edits.

10. The system of claim 8, wherein the viewer application is further configured to permit user input of a search query and display search results when there is a match between data in the electronic data file and the search query.

11. A records management method, comprising the steps of:
designating an electronic storage location for an electronic file of each representation of a page of a document;
creating an electronic data file, by utilizing a processor that executes instructions stored in memory, that corresponds to the each representation of a page, wherein the electronic data file relates the each representation of a page to the document within a project, wherein the electronic data file includes the electronic storage location for the each representation of a page;
receiving input of additional data for the electronic data file, wherein the additional data includes a category for the each representation of a page and a date for each the representation of a page;
supplementing the electronic data file with the additional data;
merging the each representation of a page with a corresponding electronic data file for the each representation of a page such that the each representation of a page and the corresponding electronic data file are accessible from a single electronic project file; and providing a summary excerpt of at least one each representation of a page.

12. The method of claim 11, further comprising the step of:
creating a description of the each representation of a page; and wherein the electronic data file includes the description of the each representation of a page.

13. The method of claim 11, further comprising the step of:
creating a unique identification code for the each representation of a page; and wherein the electronic data file includes the unique identification code for each representation of a page.

14. The method of claim 11, further comprising the steps of:

storing the merged the each representation of a page and the corresponding electronic data file; and in response to user selection of a data type in the electronic data file, filtering the each representation of a page according to the data type.

15. The method of claim 11, further comprising the step of:
scanning each page of each document in a project to create electronic image files.

16. The method of claim 11,
wherein the summary excerpt of at least one each representation of a page includes a summary of a plurality of the each representation of a page from a plurality of documents.

17. The method of claim 11,
wherein the summary of at least one each representation of a page includes a page number associated with the at least one each representation of a page.

18. The method of claim 11, further comprising the step of:
in response to user input of a search query, providing search results when there is a match between data in the electronic data file and the search query.

19. The method of claim 11, wherein the additional data includes an author for each the representation of a page.

20. The method of claim 11, further comprising the step of:
receiving input of a user edit for the each representation of a page; and supplementing the electronic data file with the user edit.

* * * * *